(12) United States Patent
Bao et al.

(10) Patent No.: US 7,266,547 B2
(45) Date of Patent: Sep. 4, 2007

(54) QUERY MEANING DETERMINATION THROUGH A GRID SERVICE

(75) Inventors: Zhendong Bao, Marietta, GA (US); Patrick J. Richards, Jr., Marietta, GA (US); William P. Shaouy, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 10/865,270

(22) Filed: Jun. 10, 2004

(65) Prior Publication Data

US 2005/0278287 A1  Dec. 15, 2005

(51) Int. Cl.
*G06F 17/30* (2006.01)
(52) U.S. Cl. .............................. 707/3; 707/10
(58) Field of Classification Search ...................... None
See application file for complete search history.

(56) References Cited

U.S. PATENT DOCUMENTS

| | | | | |
|---|---|---|---|---|
| 4,591,980 A | | 5/1986 | Huberman et al. ......... 364/200 |
| 5,630,156 A | | 5/1997 | Privat et al. ................ 395/800 |
| 5,729,472 A | | 3/1998 | Seiffert et al. | |
| 5,931,911 A | | 8/1999 | Remy et al. ................. 709/223 |
| 6,038,560 A | * | 3/2000 | Wical ............................ 707/5 |
| 6,182,139 B1 | | 1/2001 | Brendel ....................... 709/226 |
| 6,460,082 B1 | | 10/2002 | Lumelsky et al. .......... 709/226 |
| 6,516,312 B1 | * | 2/2003 | Kraft et al. .................... 707/3 |
| 6,633,868 B1 | * | 10/2003 | Min et al. ....................... 707/3 |
| 6,697,801 B1 | * | 2/2004 | Eldredge et al. ............... 707/6 |
| 2002/0147578 A1 | * | 10/2002 | O'Neil et al. .................. 704/9 |
| 2002/0152310 A1 | | 10/2002 | Jain et al. .................... 709/226 |

(Continued)

FOREIGN PATENT DOCUMENTS

EP 0790559 A 8/1997

(Continued)

OTHER PUBLICATIONS

Foster et al.; The Anatomy of the Grid, Enabling Scalable Virtual Organizations; 2001; available at www.globus.org/research/papers/anatomy.pdf as of Nov. 27, 2003.

(Continued)

*Primary Examiner*—Hosain Alam
*Assistant Examiner*—Christopher Raab
(74) *Attorney, Agent, or Firm*—John Pivnichy; Amy J. Pattillo

(57) ABSTRACT

A method, system, and program for query meaning determination through a grid service are provided. A search service within a grid environment receives a free text string as a search query, wherein the free text string includes multiple specifications. The search service controls distribution of the free text string to a selection of grid components, wherein each of the selection of grid components is enabled to interpret a particular aspect of the meaning of the multiple specifications in the free text string. Multiple aspect interpretations of the free text string are received at the search service from the selection of grid components. Next, the search service synthesizes the aspect interpretations into a search-ready query, such that the search request is first interpreted by the selection of grid components to determine a thorough meaning of the free text string before submission to a search engine.

20 Claims, 5 Drawing Sheets

U.S. PATENT DOCUMENTS

| | | | |
|---|---|---|---|
| 2002/0165979 A1 | 11/2002 | Vincent | 709/239 |
| 2003/0036886 A1 | 2/2003 | Stone | |
| 2003/0105868 A1 | 6/2003 | Kimbrel et al. | 709/226 |
| 2003/0120701 A1 | 6/2003 | Pulsipher et al. | 709/102 |
| 2003/0126265 A1 | 7/2003 | Aziz et al. | 709/227 |
| 2003/0140143 A1 | 7/2003 | Wolf et al. | 709/225 |
| 2003/0172061 A1* | 9/2003 | Krupin et al. | 707/3 |
| 2003/0191795 A1 | 10/2003 | Bernardin et al. | 709/105 |
| 2003/0200347 A1 | 10/2003 | Weitzman | 709/310 |
| 2004/0059729 A1* | 3/2004 | Krupin et al. | 707/3 |
| 2005/0027691 A1* | 2/2005 | Brin et al. | 707/3 |

FOREIGN PATENT DOCUMENTS

| | | |
|---|---|---|
| EP | 1267552 A | 12/2002 |

OTHER PUBLICATIONS

Foster et al.; The Physiology of the Grid, An Open Grid Services Architecture for Distributed Systems Integration; Jun. 22, 2002; available at www.globus/org/research/papers/ogsa.pdf as of Nov. 27, 2003.

Foster, Ian; What is the Grid? A Three Point Checklist; Jul. 20, 2002; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; Sep. 2003; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; 2002; available at www.redbooks.ibm.com/redpapers/pdfs/redp3613.pdf as of Nov. 27, 2003.

Jacob, Bart; IBM Grid Computing—Grid Computing: What are the key components?; Jun. 2003; available at www-106.ibm.com/developerworks/grid/library/gr-overview/ as of Nov. 27, 2003.

Unger et al.; IBM Grid Computing—A Visual Tour of Open Grid Services Architecture; Aug. 2003; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

Baden, Mr Hughes and Steven, Dr Bird (2003) Grid-Enabling Natural Language Engineering By Stealth. In *Proceedings HLT-NAACL03 Workshop on The Software Engineering and Architecture of Language Technology Systems*, pp. 31-38, Edmonton, Canada, available from http://eprints.unimelb.edu.au/archive/00000491 as of May 3, 2004.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al. "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

* cited by examiner

QUERY MEANING DETERMINATION THROUGH A GRID SERVICE

BACKGROUND OF THE INVENTION

1. Technical Field

The present invention relates in general to improved query meaning determination and in particular to improved query meaning determination through a grid service. Still more particularly, the present invention relates to converting free text strings into a search-ready string through a grid service that distributes the free text string to multiple meaning detectors functioning across multiple grid components and synthesizes the interpretations returned from the multiple grid components.

2. Description of the Related Art

A constant challenge within network environments is intelligently and reliably connecting users to just the right information available through the network. In particular, for those web sites providing interfaces for conducting electronic commerce, providing a way for consumers to find a specific product, service, or information is imperative.

To meet the challenge of connecting users to just the right information, a common service provided through network-based service is a search engine. Search engines receive a search query from a user and attempt to locate the information most relevant to the user's search query. Different search engines may organize data in different ways so that the data is easily searchable. For example, an index-based search engine indexes Internet documents to facilitate searching of those documents.

While the efficiency and breadth of coverage of content searchable by search engines continues to improve, a key limitation of most search engines is the actual search query entered by the user. Many users have little training or skill in determining good search terms and the mechanics of developing an effective search query to pose to a search engine is daunting for many users. Thus, a developing area of search engine improvement is the interpretation of search queries, whether the user enters keywords, phrases, or concepts as a search query. For example, natural language processing of search queries is becoming more prominent, where grammatical rules and knowledge databases are used to discover the intent or meaning of a search query and to enhance the search string used in the actual search based on that intent or meaning.

A constraint on current natural language processing tools, however, is that when a user is allowed to enter free text, the user may include multiple specifications in a single query. As the number of specifications increases within a search query, the complexity of parsing and thoroughly determining a meaning of the search query increases. And, in particular, current natural language processing tools are limited because they do not support parsing and meaning detection of multiple specification free text as an out-of-box feature. Parsing modules that look for certain categories of information within a multiple specification free text entry must be customized, leading to expensive to program, non-reusable modules that only search for programmed categories.

Therefore, in view of the foregoing, there is a need for a method, system, and program for efficiently and cost effectively converting multiple aspect natural language or other free text into a search-ready string with improved thoroughness in parsing and accuracy meaning determination in the search-ready string. In particular, there is a need for a method, system, and program for a multiple specification natural language meaning determination service available out-of-box with reusable parsing components. Further, in particular, there is a need for a network architecture for supporting efficient and accurate thoroughness in parsing multiple specification free text to determine meaning.

SUMMARY OF THE INVENTION

In view of the foregoing, the present invention in general provides for improved query meaning determination and in particular provides for improved query meaning determination through a grid service that determines meaning of multiple specification free text language. Still more particularly, the present invention relates to converting free text strings into a search-ready string through a grid service that distributes the free text string to multiple meaning detectors functioning across multiple grid components and synthesizes the interpretations returned from the multiple grid components.

According to one aspect of the invention, a search service within a grid environment receives a free text string as a search query, wherein the free text string includes multiple specifications. The search service controls distribution of the free text string to a selection of grid components, wherein each of the selection of grid components is enabled to interpret a particular aspect of the meaning of the multiple specifications in the free text string. Multiple aspect interpretations of the free text string are received at the search service from the selection of grid components. Next, the search service synthesizes the aspect interpretations into a search-ready query, such that the search request is first interpreted by the selection of grid components to determine a thorough meaning of the free text string before submission to a search engine.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
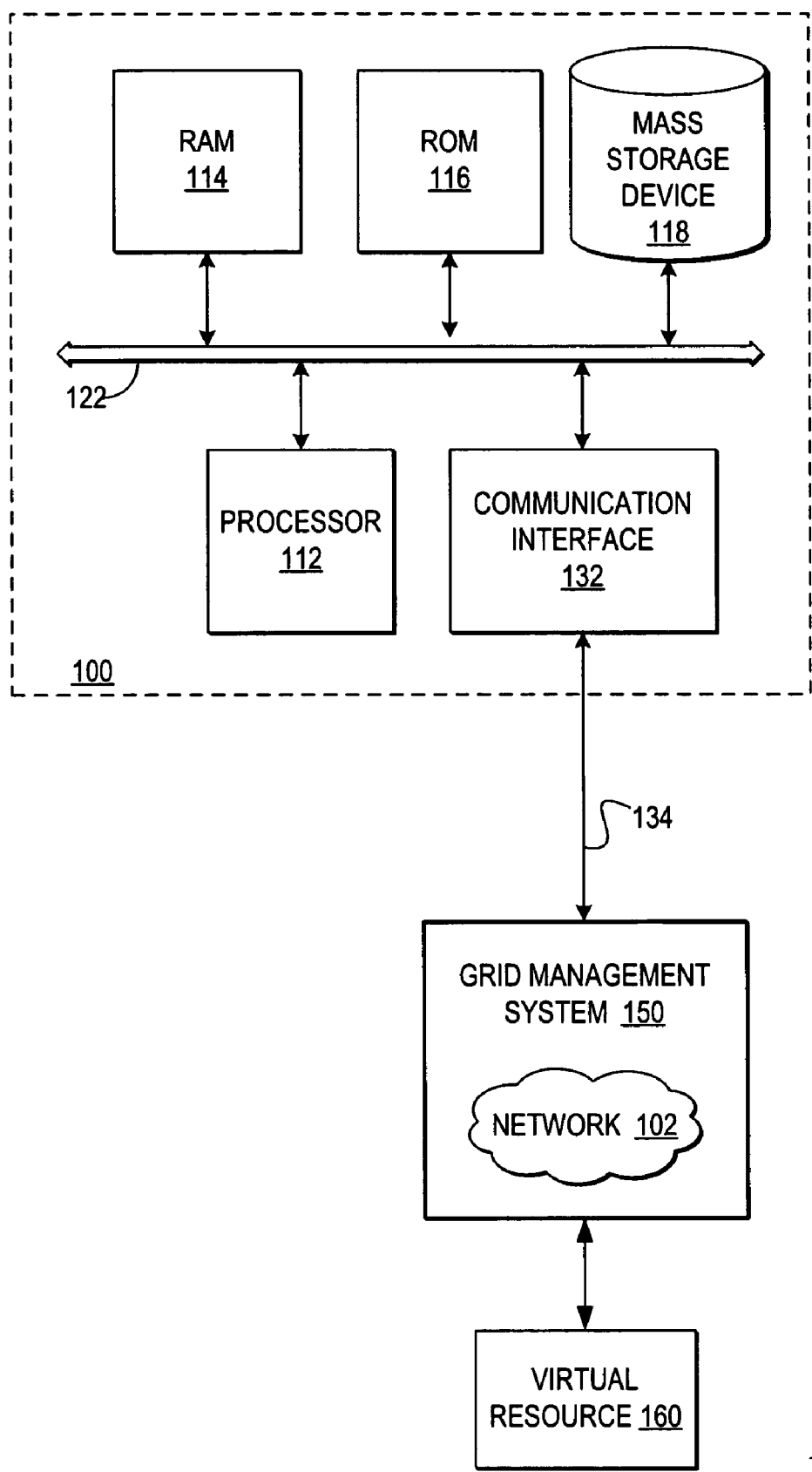
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 8, and 9 and others operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
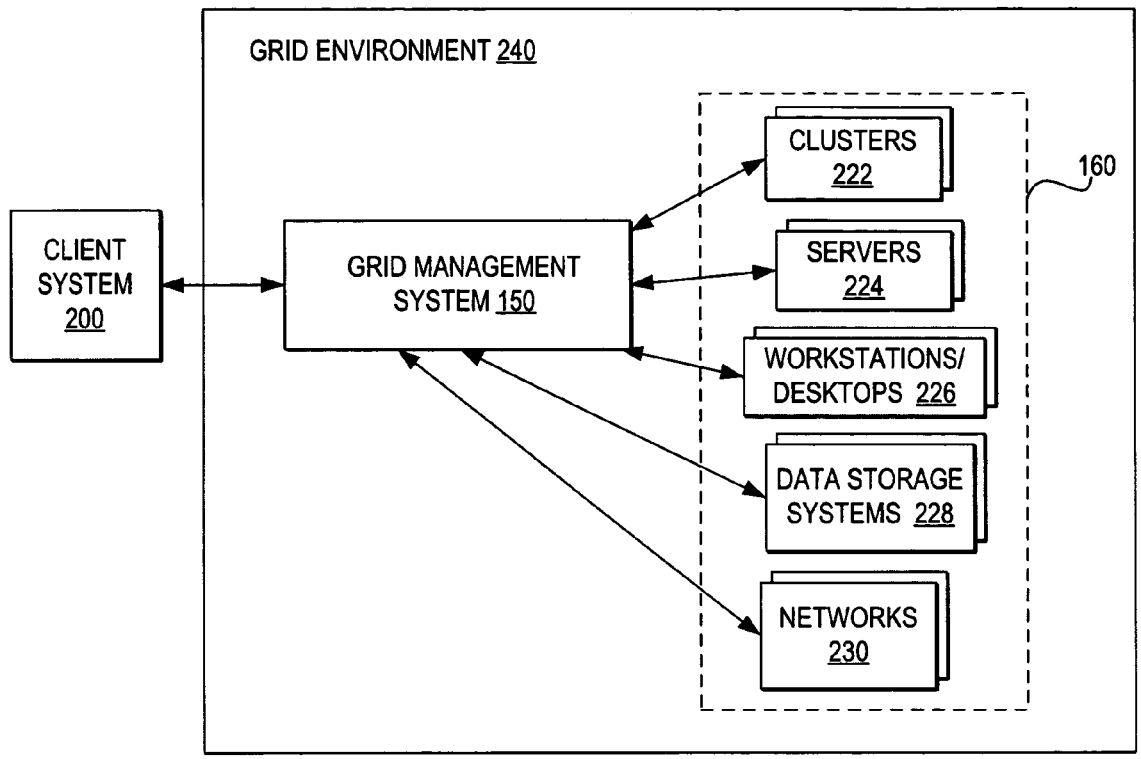
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

In one example, a grid service is invoked when grid management system 150 receives a free text string search query. The grid service is a search service that manages distribution of the free text string to multiple grid components within a virtual resource or multiple virtual resources, where each grid component is enabled to interpret a particular type of aspect of language. The grid service scavenges for aspect interpretation components within the gird environment and synthesizes the interpretation results returned from the multiple aspect interpretation components.

Figure 3:
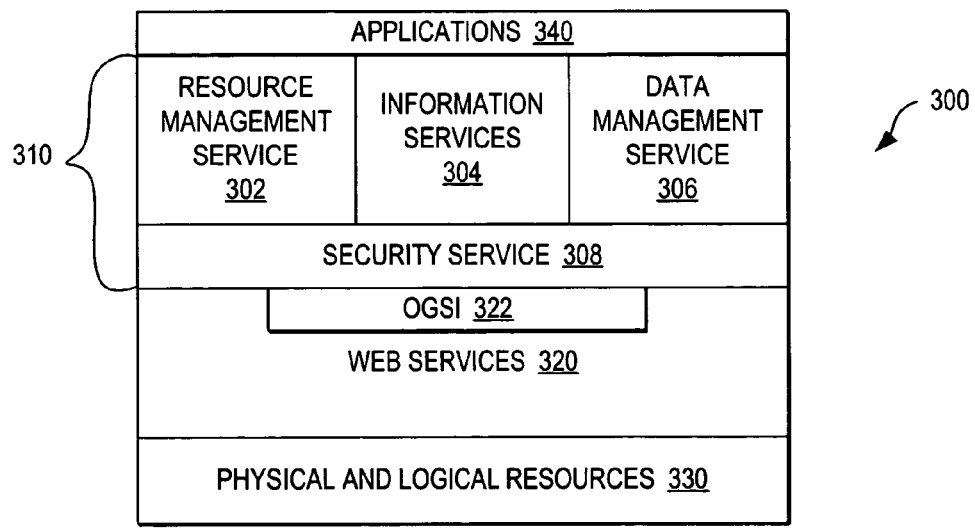
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
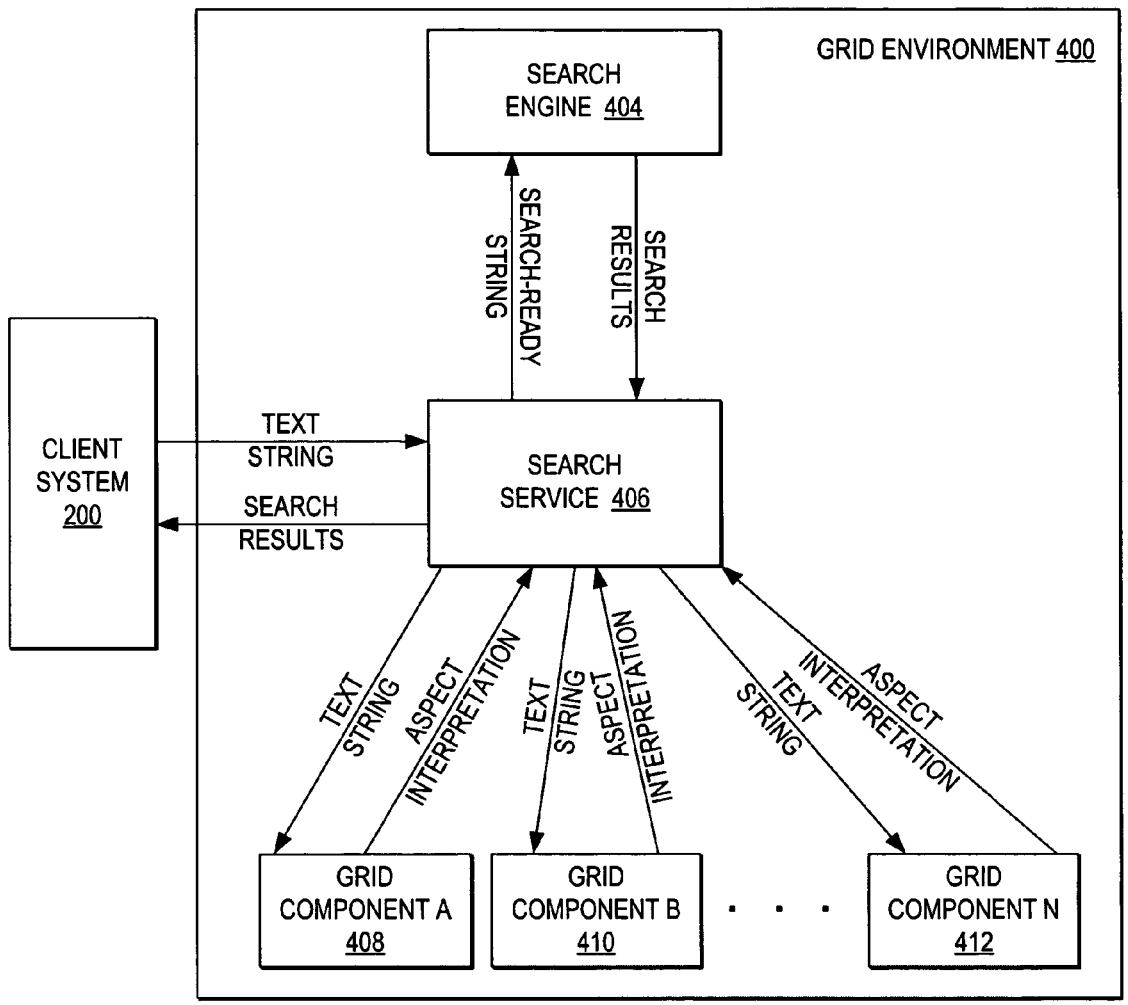
FIG. 4 is a block diagram depicting one example of the logical components of a search service operating within the grid environment in accordance with the method, system, and program of the present invention.

With reference now to FIG. 4, there is depicted a block diagram of the logical components of a search service functioning within a grid environment in accordance with the method, system, and program of the present invention. As depicted, search service 406, within a grid environment 400, receives text strings from a client system 200. The text strings may include free text entered in the form of natural language, Boolean expressions, and other forms of text input. It is important to note that the text string may include multiple specifications, where the multiple specifications may be provided using multiple words, phrases, or symbols or a single word, phrase, or symbol. In particular, when a text string includes multiple specifications, it may include multiple aspects that can be interpreted.

Search service 406 then distributes the text string to multiple logical grid components. For example, search service 406 may distribute the text string to grid components 408, 410, and 412. As referred to in the example, grid components 408, 410, and 412 may include groupings of multiple types of grid resources and may each be considered a virtual resource.

In the example, in distributing the text string to grid components 408, 410, and 412, search service 406 preferably schedules and coordinates distribution of the text string a selection of multiple available grid components. In particular, each grid component preferably includes a meaning detector for analyzing the text string for a particular aspect and then interpreting the aspect if it is found. More specifically, each grid component may include a knowledge and grammar controller for enabling the grid component to determine the meaning of a particular aspect.

According to one embodiment, the selection of grid components 408, 410, and 412 each process the text string for a different aspect in parallel so that search service 406 receives interpretation results quickly and concurrently from the selection of grid components. In particular, by processing a multiple specification text string by multiple grid components running in parallel, an efficient, thorough, and accurate parsing of the text string is available.

In addition, according to one embodiment, grid components 408, 410, and 412 can be accessed by multiple search services, such as search service 406. In particular, within a grid environment, a different instance of a search service may be invoked to handle each search request. Further, different instances of the same type of search service may be invoked from different web interfaces. Thus, grid components 408, 410, and 412 may be available as "plug-and-play" components that are reusable for multiple search requests, by multiple clients invoking search services, and by multiple of search services.

Within grid environment 400, search service 406 may have access to multiple grid components that analyze the same aspect. For a particular search, however, search service 406 may only schedule one grid component to analyze each particular aspect. Thus, search service 406 may schedule and coordinate distribution of each text string to a selection of available grid components that analyze multiple types of aspects, but that also meet particular performance criteria. In particular, each grid component may designate performance specifications and costs, where search service 406 preferably schedules those available grid components that meet performance and cost requirements for a free text string search. Further, any of grid components 408, 410, and 412 may be classified as on-demand resources that can be allocated to meet peak load requirements or other performance requirements.

Search service 406 may determine which aspect components to invoke for a particular text string interpretation based on selections by a system administrator, a user, or preliminary analysis of the type of text string. It will be understood that as the number of aspects interpreted increases, greater thoroughness in parsing is achieved in attempts to reach a more accurate final search result. In addition, grid components 408, 410, and 412 are preferably configurable such that search service 406, a user, or a system administrator can enable or disable any single grid component or component group for a particular text string interprentation. In particular, where grid resources are constrained or a user wants a specific match, it may be advantageous to allow manual control of the selection of grid components.

The selection of grid components preferably concurrently return interpretations of different aspects of the text string to search service 406. Search service 406 synthesizes the interpretations returned from each of the grid components into an accurate and thorough search-ready string describing the search specification and passes the search-ready string to search engine 404. A search-ready string is preferably a search query in a format and protocol implemented by search engine 404. In addition, a search-ready string may be a search query in a format and protocol that can be converted into a format and protocol implemented by search engine 404.

Search engine 404 receives the search-ready string and performs a search using the search-ready string. Search engine 404 may perform multiple types of searches including, but not limited to, database searches, web page searches, and searches of products, services, information, and other collective data accessible to search engine 404. Search engine 404 preferably returns search results to search service 406. Search service 406 then returns the search results to client system 200.

Figures 5, 6:
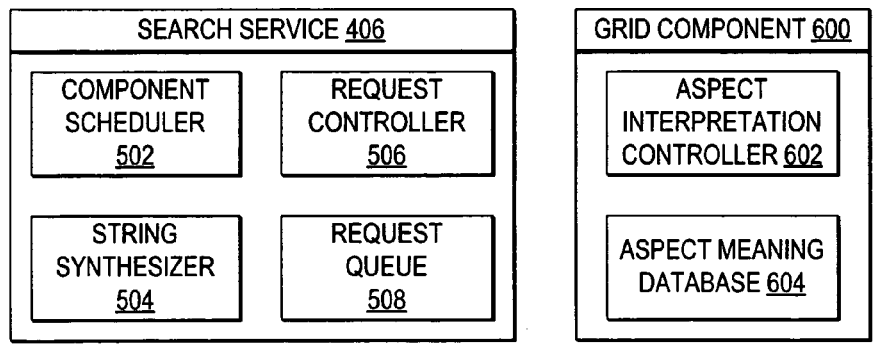
FIG. 5 is a block diagram depicting the components of a search service in accordance with the method, system, and program of the present invention.
FIG. 6 is a block diagram depicting a grid component specified to interpret a particular aspect in accordance with the method, system, and program of the present invention.

Referring now to FIG. 5, there is depicted a block diagram of the components of a search service in accordance with the method, system, and program of the present invention. In particular, search service 406 includes a combination of components including, but not limited to, a component scheduler 502, a string synthesizer 504, a request controller 506, and a request queue 508. Text strings received by search service 406 are added to request queue 508. A component scheduler 502 schedules aspect components for use in interpreting multiple aspects of the text string and distributes the text string to the scheduled components. Aspect interpretations received from the multiple aspect components are gathered in request queue 508 with the original text string. A string synthesizer 504 synthesizes the aspect interpretations into a search-ready string. Request controller 506 then passes the search-ready string to a search engine, receives the search results, formats the search results for the requester, and returns the search results to the requester. It will be understood that additional components necessary for implementing a grid service may be included in search service 406.

With reference now to FIG. 6, there is depicted a block diagram of a grid component specified to interpret a particular aspect in accordance with the method, system, and program of the present invention. As depicted, a grid component 600 includes a combination of components including, but not limited to, an aspect interpretation controller 602 and an aspect meaning database 604. Aspect interpretation controller 602 preferably interprets a particular aspect of text strings to determine the meaning of the text string. Aspect interpretation controller 602 may perform knowledge and grammar interpretation, referring to aspect meaning database 604 for interpretation criteria, rules, data, and other information helpful in interpreting a meaning. It will be understood that additional controllers, databases, and other resources necessary for implementing a grid aspect interpretation component may be included in grid component 600. Furthermore, it is important to note that aspect interpretation controller 602 and meaning database 604 are accessible as reusable resources combined to create a grid component that interprets a particular aspect.

Figure 7:
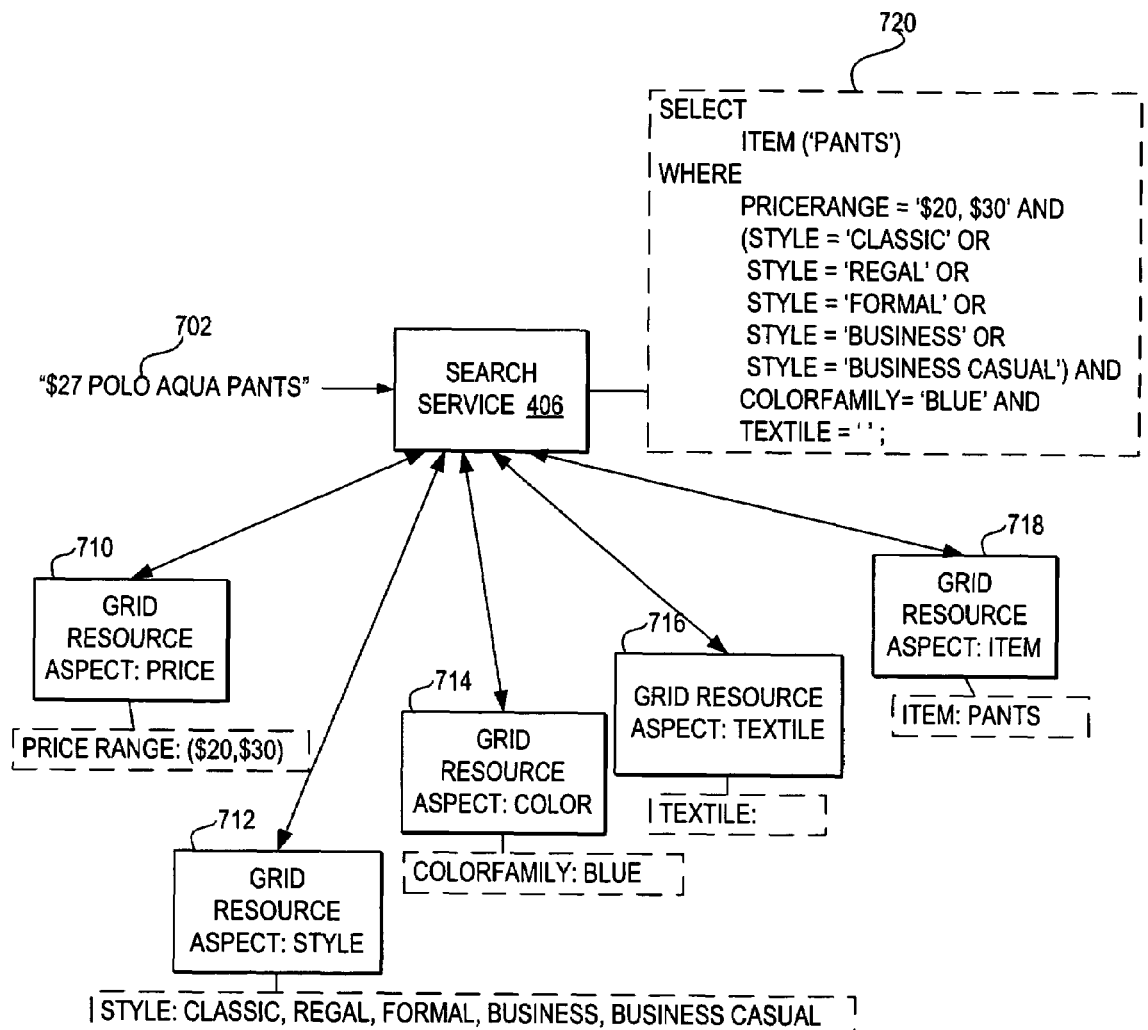
FIG. 7 is an illustrative example depicting a search service converting a text string into search-ready string using multiple grid components to interpret multiple aspects of the text string.

Referring now to FIG. 7, there is depicted an illustrative example of a search service converting a text string into search-ready string using multiple grid components to interpret multiple aspects of the text string. As depicted, search service 406 receives a text string 702. In the example, text string 702 is "$27 polo aqua pants".

Search service 406 schedules multiple grid components to interpret multiple aspects of text string 702. In the example, search service 406 schedules grid component 710 to interpret any "price" aspect, grid component 712 to interpret any "style" aspect", grid component 714 to interpret any "color" aspect, grid component 716 to interpret any "textile" aspect, and grid component 718 to interpret any "item" aspect. Each grid component may include dictionaries of terms and phrases and implement other meaning detectors enabled to interpret the meaning and context of particular aspects of multiple specification, natural language text string. It will be understood that the aspects interpreted by grid components 710, 712, 714, 716, and 718 are provided merely as illustrative examples of the types of aspects that may be interpreted by a grid component and not as limitations on the aspects of text strings that may be interpreted by grid components.

In the example, more specifically, grid component 710 detects and interprets the "price" aspect of text string 702 of "$27". In particular, grid component 710 interprets that "$27" is a "price" aspect and returns an interpretation of "price range: ($20, $30)".

Next, as depicted, grid component 712 detects and interprets the "style" aspect of text string 702 of "polo". In particular, grid component 712 interprets that "polo" is a "style" aspect and returns an interpretation of "style: classic, regal, formal, business, business casual."

Grid component 714 detects and interprets the "color" aspect of text string 702 of "aqua". In particular, grid component 714 interprets that "aqua" is a "color" aspect and returns an interpretation of "color family: blue".

Grid component 716 depicts and interprets the "textile" aspect of text string 702. In particular, the interpretation returned by grid component 716 indicates that no "textile" aspect is included in text string 702. It is important to note that search service 406 may schedule grid components to interpret a aspect that is not included the text string.

Grid component 718 depicts and interprets the "item" aspect of text string 702 of "pants". In particular, grid component 718 interprets that "pants" is an "item" and returns an interpretation of "item: pants".

Search service 406 retrieves the attribute interpretations from the grid components and synthesizes the interpretations in a search-ready string 720. Preferably, search service 406 uses a format and protocol for preparation of search-ready string 720 that are understandable by search engine 404. In the example, the search-ready string is implemented in a Boolean operator format using pre-defined variables "item", "price range", "style", "color family", and "textile" for aspects. In addition, while in the example, the pre-defined variable names match the aspect names returned by each of the grid components, it will be understood, that in synthesizing search ready string 720, search service 406 may map the aspect interpretations to the format required for the search-ready string.

It is important to note that the goal of search service 406 is to capture the meaning of the multiple specifications of text string 702 and determine a search-ready string representing the meaning of text string 702. In the example, through the flexibility of using grid components to interpret the meaning of different aspects of the text string, an accurate and efficient method, system, and program are implemented to convert text string 702 into search-ready string 720.

Figure 8:
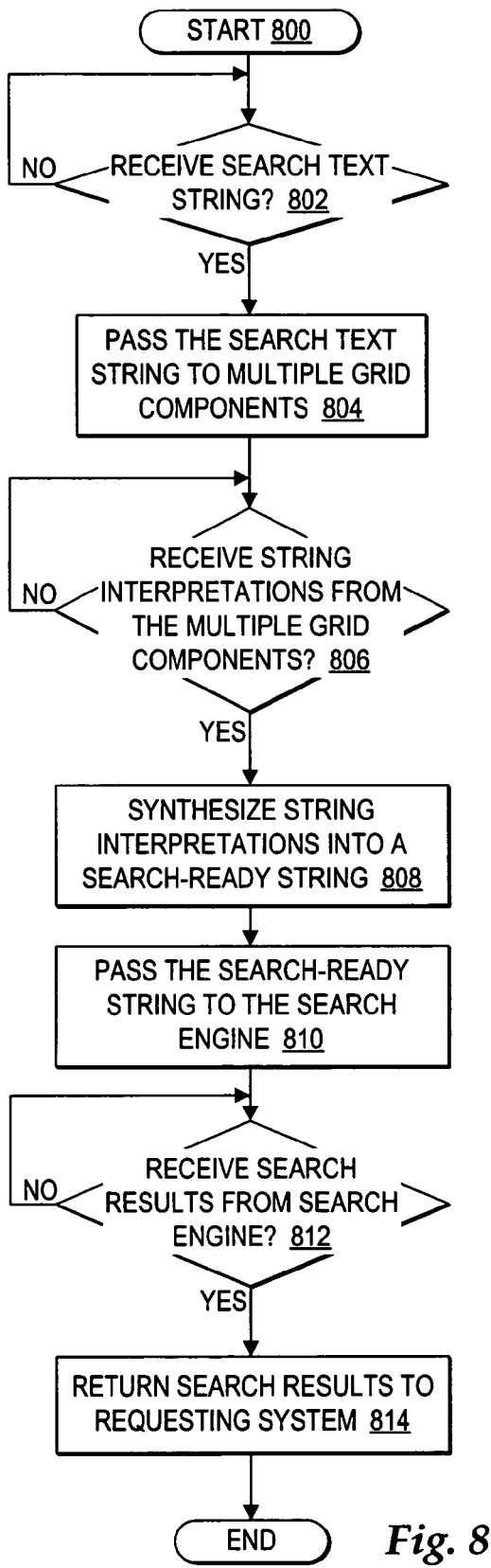
FIG. 8 is a high level logic flowchart depicting a process and program for controlling a search service in accordance with the method, system, and program of the present invention.

With reference now to FIG. 8, there is depicted a high level logic flowchart of a process and program for controlling a search service in accordance with the method, system, and program of the present invention. As depicted, the process starts at block 800 and thereafter proceeds to block 802. Block 802 depicts a determination whether a search text string is received. If a search text string is not received, then the process iterates at block 802. If a search text string is received, then the process passes to block 804. Block 804 depicts passing the search text string to multiple grid components. Next, block 806 depicts a determination whether string interpretations are received from each of the multiple grid components. If string interpretations are not yet received from all the grid components, then the process iterates at block 806. If string interpretations are received from all the grid components, then the process passes to block 808.

Block 808 depicts synthesizing the string interpretations into a search-ready string. Next, block 810 depicts passing the search-ready string to the search engine. Thereafter, block 812 depicts a determination whether search results are received from the search engine. If search results are not yet received from the search engine, then the process iterates at block 812. If search results are received from the search engine, then the process passes to block 814. Block 814 depicts returning the search results to the requesting system, and the process ends.

Figure 9:
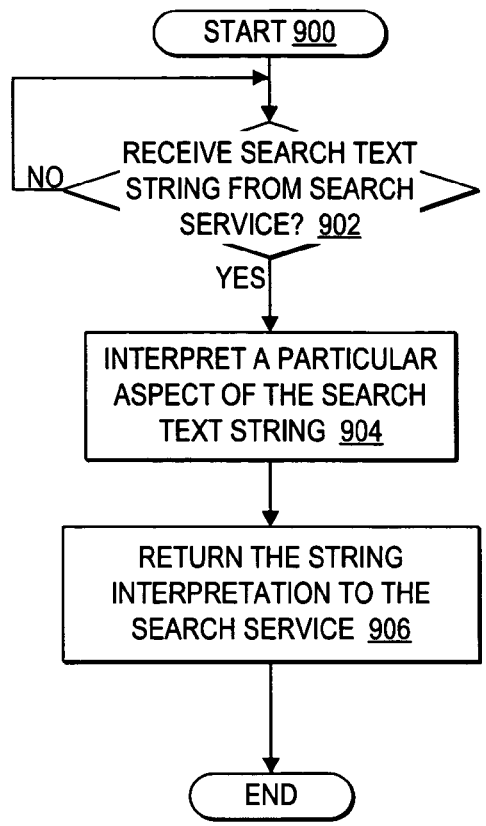
FIG. 9 is a high level logic flowchart depicting a process and program for controlling a grid component in accordance with the method, system, and program of the present invention.

Referring now to FIG. 9, there is depicted a high level logic flowchart of a process and program for controlling a grid component in accordance with the method, system, and program of the present invention. As depicted, the process starts at block 900 and thereafter proceeds to block 902. Block 902 depicts a determination whether a search text string is received from a search service. If a search text string is not received from a search service, the process iterates at block 902. If a search text string is received from a search service, then the process passes to block 904. Block 904 depicts interpreting a particular aspect of the search text string. Next, block 906 depicts returning the string interpretation to the search service, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for handling a free text search query, comprising:
    a grid environment comprising a plurality of computing systems each comprising at least one resource and communicatively connected over a network to share each said at least one resource through at least one grid service implemented within an open grid services architecture enabling interfacing with each said at least one resource through at least one web service;
    a grid management system for receiving a plurality of separate job requests from a plurality of client systems over said network and for managing distribution of said plurality of separate job requests to at least one grid service from among said plurality of grid services;
    said grid management system, responsive to said grid management system receiving a particular job request from a particular client system with a free text string comprising a plurality of specifications as a search query, for invoking a search service from among said plurality of grid services to perform said job request; and
    said search service comprising:
        means for controlling distribution of said free text string to a selection of a plurality of grid components, wherein each of said selection of said plurality of grid components is enabled to interpret a meaning of a particular aspect of said plurality of specifications in said free text string, wherein each of said plurality of grid components comprises at least one of said at least one resource;
        means for receiving a plurality of aspect interpretations of said free text string from said selection of said plurality of grid components;
        means for synthesizing said plurality of aspect interpretations into a search-ready query;
        means for passing said search-ready query to a search engine within said grid environment; and
        means, responsive to receiving at least one search result for said search-ready query from said search engine, for returning said at least one search result to said particular client system.

2. The system according to claim 1 for handling a free text search query, wherein said search-ready query further comprises a search query formatted for submission to said search engine.

3. The system according to claim 1 for handling a free text search query, wherein at least one of said plurality of specifications within said free text string comprises a symbol.

4. The system according to claim 1 for handling a free text search query, said search service further comprising:
    means for distributing each separate aspect within said plurality of specifications to a separate grid component within said selection of said plurality of grid components in parallel to facilitate concurrent receipt of a plurality of aspect interpretations for each said separate aspect received by said search service from said selection of said plurality of grid components.

5. The system according to claim 1 for handling a free text search query, each of said plurality of grid components further comprising:
    a mean database comprising at least one rule for interpreting a separate particular aspect; and
    an aspect interpretation controller for interpreting said separate particular aspect of at least one said plurality of specifications of said free text string.

6. The system according to claim 1 for handling a free text search query, said search service further comprising:
    means for scheduling said selection of said plurality of grid components, wherein each of said selection of said plurality of grid components meets a performance requirement for handling said search request.

7. The system according to claim 1 for handling a free text search query, wherein said selection of said plurality of grid components are reusable by said grid management system across any of a plurality of search services invoked for interpreting job requests comprising search queries.

8. A method for handling a free text search query, comprising:
    enabling a grid environment comprising a plurality of computing systems each comprising at least one resource and communicatively connected over a network to share each said at least one resource through at least one grid service implemented within an open grid services architecture enabling interfacing with each said at least one resource through at least one web service;
    receiving a plurality of separate job requests from a plurality of client systems over said network at a grid management system;
    managing distribution from said grid management system of said plurality of separate job requests to at least one grid service from among said plurality of grid services;
    responsive to said grid management system receiving a particular job request from a particular client system with a free text string comprising a plurality of specifications as a search query, invoking a search service from among said plurality of grid services to perform said job request;

controlling distribution of said free text string from said search service to a selection of a plurality of grid components, wherein each of said selection of said plurality of grid components is enabled to interpret a meaning of a particular aspect of said plurality of specifications in said free text string, wherein each of said plurality of grid components comprises at least one of said at least one resource;

receiving at said search service a plurality of aspect interpretations of said free text string from said selection of said plurality of grid components;

synthesizing said plurality of aspect interpretations at said search service into a search-ready query;

passing said search-ready query from said search service to a search engine within said grid environment; and responsive to receiving at least one search result for said search-ready query from said search engine at said search service, returning said at least one search result from said search service to said particular client system.

9. The method according to claim 8 for handling a free text search query, further comprising:
formatting said search-ready query into a particular search query format required for submission to said search engine.

10. The method according to claim 8 for handling a free text search query, wherein at least one of said plurality of specifications within said free text string comprises a symbol.

11. The method according to claim 8 for handling a free text search query, further comprising:
distributing by said search service each separate aspect within said plurality of specifications to a separate grid component within said selection of said plurality of grid components in parallel to facilitate concurrent receipt of a plurality of aspect interpretations for each said separate aspect received by said search service from said selection of said plurality of grid components.

12. The method according to claim 8 for handling a free text search query, further comprising:
interpreting a separate particular aspect at each of said plurality of grid components by a separate aspect interpreter controller based on at least one rule accessed from a separate meaning database specified for interpreting said separate particular aspect.

13. The method according to claim 8 for handling a free text search query, further comprising:
scheduling said selection of said plurality of grid components, wherein each of said selection of said plurality of grid components meets a performance requirement for handling said search request.

14. The method according to claim 8 for handling a free text search query, wherein said selection of said plurality of grid components are reusable by said grid management system across any of a plurality of search services invoked for interpreting job requests comprising search queries.

15. A computer program product, stored on a volatile or non-volatile computer readable medium, for handling a free text search query, which when executed by a processor comprises:
enabling a grid environment comprising a plurality of computing systems each comprising at least one resource and communicatively connected over a network to share each said at least one resource through at least one grid service implemented within an open grid services architecture enabling interfacing with each said at least one resource through at least one web service;

receiving a plurality of separate job requests from a plurality of client systems over said network at a grid management system;

managing distribution from said grid management system of said plurality of separate job requests to at least one grid service from among said plurality of grid services;

responsive to said grid management system receiving a particular job request from a particular client system with a free text string comprising a plurality of specifications as a search query, invoking a search service from among said plurality of grid services to perform said job request;

controlling distribution of said free text string from said search service to a selection of a plurality of grid components, wherein each of said selection of said plurality of grid components is enabled to interpret a meaning of a particular aspect of said plurality of specifications in said free text string, wherein each of said plurality of grid components comprises at least one of said at least one resource;

receiving a plurality of aspect interpretations of said free text string from said selection of said plurality of grid components;

synthesizing said plurality of aspect interpretations at said search service into a search-ready query;

passing said search-ready query from said search service to a search engine within said grid environment; and responsive to receiving at least one search result for said search-ready query from said search engine at said search service, returning said at least one search result from said search service to said particular client system.

16. The computer program product according to claim 15 for handling a free text search query, further comprising
formatting said search-ready query into a particular search query format required for submission to said search engine.

17. The computer program product according to claim 15 for handling a free text search query, wherein at least one of said plurality of specifications within said free text string comprises a symbol.

18. The computer program product according to claim 15 for handling a free text search query, further comprising:
distributing by said search service each separate aspect within said plurality of specifications to a separate grid component within said selection of said plurality of grid components in parallel to facilitate concurrent receipt of a plurality of aspect interpretations for each said separate aspect received by said search service from said selection of said plurality of grid components.

19. The computer program product according to claim 15 for handling a free text search query, further comprising:
interpreting a separate particular aspect at each of said plurality of grid components by a separate aspect interpreter controller based on at least one rule accessed from a separate meaning database specified for interpreting said separate particular aspect.

20. The computer program product according to claim 15 for handling a free text search query, further comprising:
scheduling said selection of said plurality of grid components, wherein each of said selection of said plurality of grid components meets a performance requirement for handling said search request.

* * * * *